(No Model.)
D. BEST.
TRAVELING HARVESTER.
No. 480,006. Patented Aug. 2, 1892.
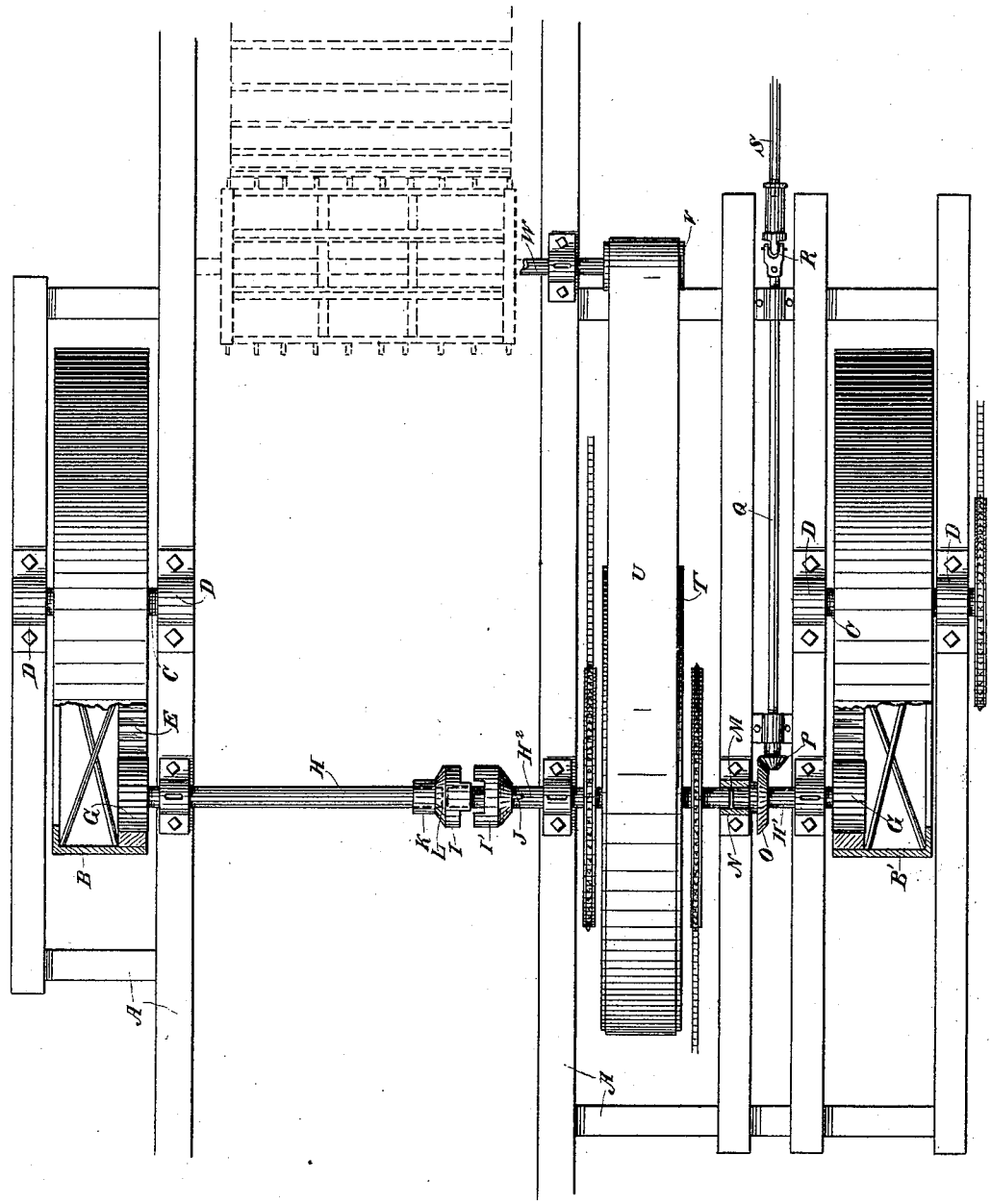
Witnesses:
Inventor,
Daniel Best.
By Dewey & Co.
Attys

UNITED STATES PATENT OFFICE.

DANIEL BEST, OF SAN LEANDRO, CALIFORNIA.

TRAVELING HARVESTER.

SPECIFICATION forming part of Letters Patent No. 480,006, dated August 2, 1892.

Application filed September 14, 1891. Serial No. 405,696. (No model.)

*To all whom it may concern:*

Be it known that I, DANIEL BEST, a citizen of the United States, residing at San Leandro, county of Alameda, State of California, have invented an Improvement in Traveling Harvesters; and I hereby declare the following to be a full, clear, and exact description of the same.

My invention relates to certain improvements in traveling harvesters and thrashers.

It consists in certain details of construction and the means for applying the power of the two driving-wheels independently to the heading and conveying portion of the apparatus and to the thrashing and cleaning portion, respectively, and in certain details of construction, which will be more fully explained by reference to the accompanying drawing, in which—

The figure is a horizontal plan view showing the driving-wheels and intermediate gearing, the upper part of the machine being removed.

A is the framework of the thrashing-machine, and B B' are two bearing-wheels, each having a short shaft C. These shafts are journaled independently in boxes D upon opposite sides of the machine, these boxes being fixed upon the frame-timbers A, so that each of the wheels B B' turns upon its own shaft independently of the other. Each of these wheels has an internal gearing E, fixed around its inner periphery close to the inner edge, and these are engaged by the spur-pinions G, which are fixed upon the outer ends of the shafts H H', said shafts being journaled in line across the frame-timbers A, so as to engage the internal gears E at points just above the horizontal line of the journal-shafts C and at the rear portion of the wheels B. By this construction the shafts H H' are caused to rotate in the same direction with the wheels B and I am enabled to dispense with intermediate gears for changing the direction of the shaft H, so as to drive the thrashing-cylinder in the required direction, and which are necessary when exterior gears are employed. By reason of the large diameter of these wheels and the comparatively small diameter of the pinions G, I am enabled to produce the high speed which is necessary for driving the thrashing-cylinder without the use of many intermediate gears with their attendant friction.

The shaft driven by the left wheel B is divided into two parts H and $H^2$, the ends of which meet within the hub K of the part I of the clutch I I'. The part I' of this clutch slides upon a feather J and is actuated by a suitable lever. (Not here shown.) The part I of the clutch has a hub K of considerable length. The right end of the shaft H enters this hub, which, being of considerable length, serves as a bearing for this end of the shaft, which is supported within the hub K. The shafts H $H^2$ are separated within the portion I of the clutch, as shown at L, so that when the two portions of the clutch are separated the wheel B may revolve and drive the shaft H, which is to the left of the clutch; but the shaft $H^2$ will remain stationary on account of the division shown at L. The shaft H', which is driven from the wheel B', is separated from the part $H^2$ at the point M, where it is journaled in the bearing-box N. The shaft H', situated at the extreme right of the machine and driven by the wheel B', carries a beveled gear-wheel O, which engages with a beveled pinion P, and thus drives the shaft Q, which extends between two of the timbers A A, as shown, toward the front of the machine, where it is connected by a universal joint R with the shaft S. This shaft extends forward and carries a crank or eccentric wheel (not shown) by which the sickle is driven in the usual manner, and also pulleys by which the draper or carrying-belt is driven. These parts are not here shown, as forming no part of my present invention.

By reason of this construction of two shafts in line, journaled in a single box, as shown at M, it will be manifest that the shaft H' to the right of this box receives its power directly from the wheel B' and serves to drive the header portion of the apparatus independently of the left and central sections H and $H^2$, which are driven from the wheel B, and the section $H^2$, by which the thrashing-cylinder is driven, may also be disengaged from H and the driving-wheel B.

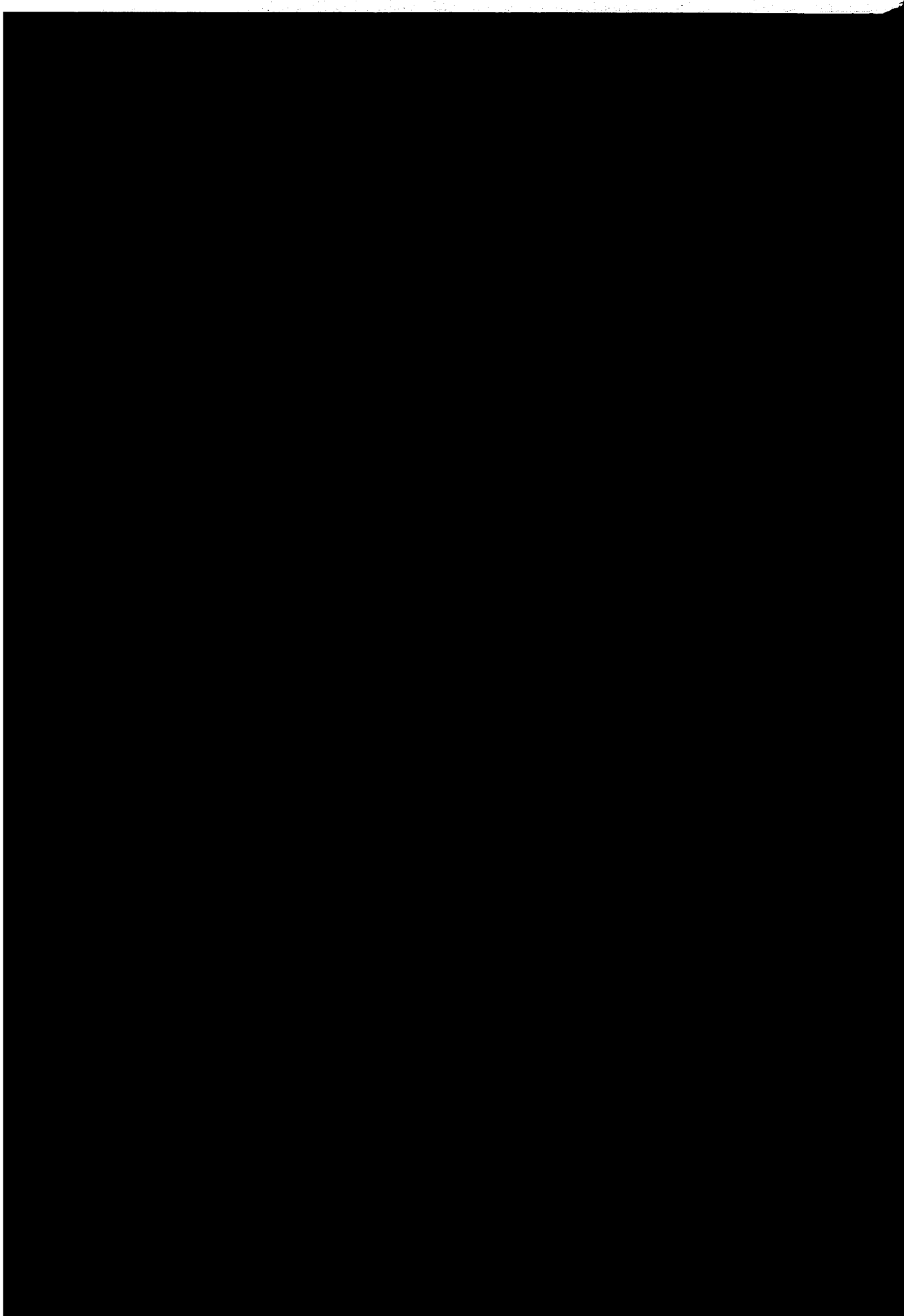

T is a belt-pulley of large diameter, fixed directly upon the central section $H^2$ of the